No. 767,904. PATENTED AUG. 16, 1904.
T. LINKE.
WASTE PIPE TRAP.
APPLICATION FILED DEC. 27, 1902.
NO MODEL.

Witnesses
E. K. Reichenbach
Roy C. Hefleboner

Inventor
Theodore Linke.
By H. B. Willson & Co.
Attorneys

No. 767,904.

Patented August 16, 1904.

UNITED STATES PATENT OFFICE.

THEODORE LINKE, OF NEW YORK, N. Y.

WASTE-PIPE TRAP.

SPECIFICATION forming part of Letters Patent No. 767,904, dated August 16, 1904.

Application filed December 27, 1902. Serial No. 136,773. (No model.)

*To all whom it may concern:*

Be it known that I, THEODORE LINKE, a citizen of the United States, residing at New York, in the county of New York and State of New York, have invented certain new and useful Improvements in Waste-Pipe Traps; and I do declare the following to be a full, clear, and exact description of the invention, such as will enable others skilled in the art to which it appertains to make and use the same.

My invention is an improved waste-pipe trap; and it consists in the peculiar construction and combination of devices hereinafter fully described and claimed.

The object of my invention is to provide a novel device of this character in which a quantity of water will be retained in a reservoir during the siphonic action of the trap and employed after the siphon is broken to reseal the trap, and thereby effectually bar the passage of sewer-gas.

Figure 1:
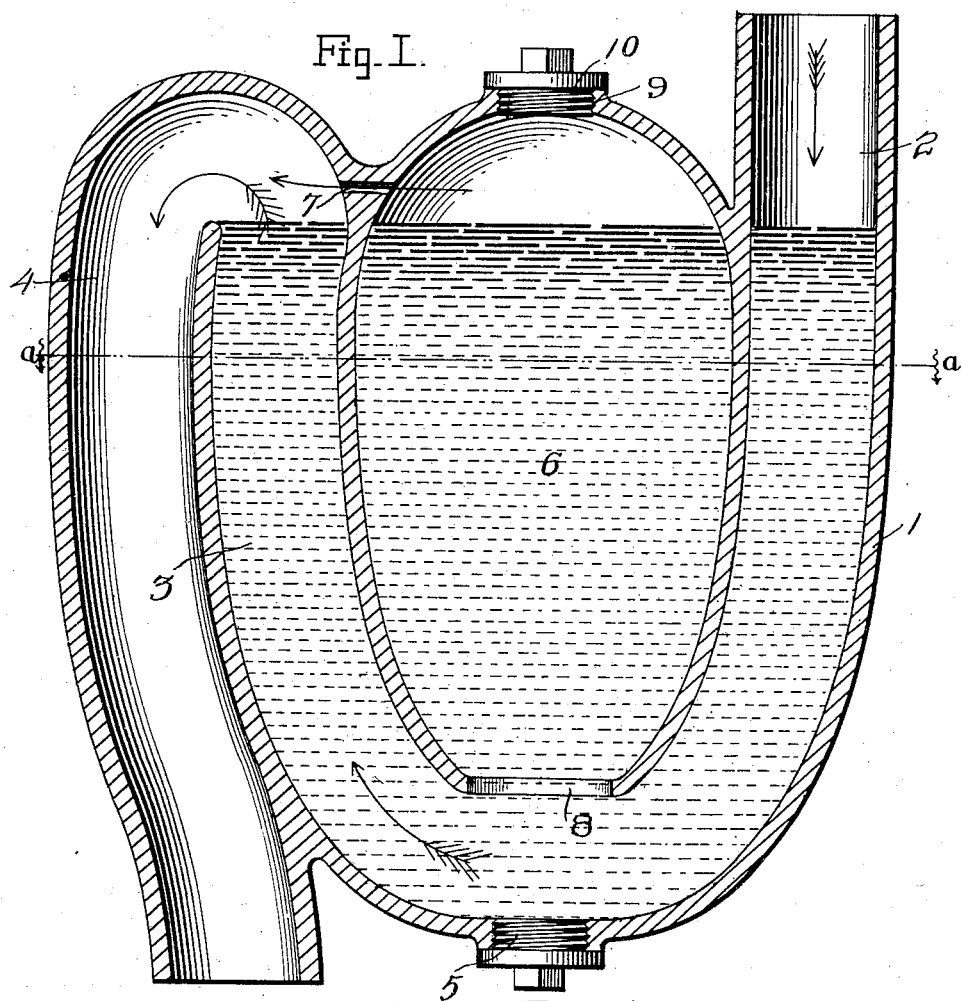
Figure 2:
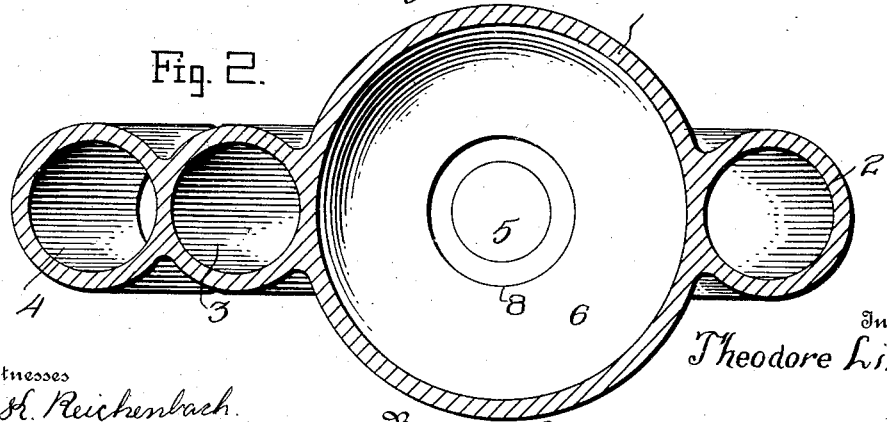

In the accompanying drawings, Figure 1 is a vertical central sectional view of a waste-pipe trap constructed in accordance with my invention; and Fig. 2 is a sectional view of the same, taken on the plane indicated by the line *a a* of Fig. 1.

In the embodiment of my invention here shown there is a seal-trap 1, provided with the descending intake-leg 2 and the ascending discharge-leg 3, having a gooseneck 4. In the lower side of the seal-trap 1 is a threaded opening in which is a screw-threaded detachable clean-out plug 5. Above the said trap is a water-reservoir 6 of suitable capacity which communicates near its upper side with the discharge-leg 3 of the trap at a point opposite the gooseneck 4, through an aperture 7. The lower end of the said reservoir communicates directly with the upper side of the trap through an opening 8. In the upper end of the reservoir is a screw-threaded opening 9, in which is a detachable screw-plug 10, forming a closure therefor. Said plugs 5 10 enable the trap to be readily cleansed when the same becomes necessary, as will be understood.

I prefer to construct the main portion of my trap of a circular shape in cross-section, with the legs 2 and 3 upon diametrically opposite sides thereof and joined together at the lower end of said main or central portion. The leg 3 and gooseneck 4 are arranged side by side, so as to form a vertically-extending radial rib from the top to the bottom of the trap and separated from each other by a vertical wall, the upper end of said wall terminating below the union of the leg and gooseneck and determining the point at which the water is to stand in the central portion to form the seal. The walls of the central portion 6 also form the inner walls of the legs 2 and 3, and thereby make a very strong, neat, and cheap construction, which may be made from any suitable material. The opening 7 in one of said walls is of a much less cross-sectional area than the gooseneck and is located at such a distance above the top of the wall between the discharge-leg and the gooseneck that but little, if any, water can ever pass through it, thereby avoiding the liability of its becoming clogged up.

In the operation of my improved trap the reservoir 6 becomes filled with water from the seal chamber or trap 1 through the opening 8. During the siphonic action of the trap when the water is discharged from the seal-chamber 1 through the discharge-leg and gooseneck a vacuum is created in the upper portion of the reservoir 6 above the level of the water therein, and hence the water is retained in said vessel until the siphonic action of the trap ceases, whereupon air is admitted to the upper portion of the vessel 2 through the aperture 7 and causes water in the said vessel or reservoir to be discharged therefrom through the opening 8 into the trap 1 and effectually reseal the same.

I do not desire to limit myself to the precise construction and combination of devices herein shown and described, as it is evident that modifications may be made therein without departing from the spirit of my invention and within the scope of the appended claim.

Having thus fully described my invention, what I claim as new, and desire to protect by Letters Patent of the United States, is—

A waste-pipe trap consisting of a central section, an inlet and an outlet leg and a gooseneck, the outlet-leg and the gooseneck being opposite to the inlet-leg and lying side by side to form a vertically-extending radial rib from the top to the bottom of the central portion and separated from each other by a single wall which terminates at a point below the union of the leg and the neck, and the wall of the central portion forming the inner walls of the two legs, respectively, and the portion of said wall adjacent to the outlet being provided with a perforation at a point along the wall between the outlet and the gooseneck, said perforation being of a less area in cross-section than the gooseneck, and the top and bottom of the central portion and the union of the legs below the central portion being each provided with an opening, and a removable plug in the openings on the top of the central portion and of the union between the legs, respectively.

In testimony whereof I have hereunto set my hand in presence of two subscribing witnesses.

THEODORE LINKE.

Witnesses:
THOS. LEONARD,
FRED W. POUGHKEEPSIE.